(12) United States Patent
Kim et al.

(10) Patent No.: US 7,697,484 B2
(45) Date of Patent: Apr. 13, 2010

(54) METHOD OF PROVIDING COOPERATIVE DIVERSITY IN A MIMO WIRELESS NETWORK

(75) Inventors: Sung-Jin Kim, Suwon-si (KR); Ho-Ji Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 716 days.

(21) Appl. No.: 11/407,749

(22) Filed: Apr. 20, 2006

(65) Prior Publication Data

US 2006/0239222 A1    Oct. 26, 2006

Related U.S. Application Data

(60) Provisional application No. 60/673,133, filed on Apr. 20, 2005.

(30) Foreign Application Priority Data

Jul. 7, 2005    (KR) ............... 10-2005-0061171

(51) Int. Cl.
*H04W 4/00*    (2006.01)
(52) U.S. Cl. .................... 370/334; 455/33.3
(58) Field of Classification Search ............. 370/328, 370/315
See application file for complete search history.

(56) References Cited

U.S. PATENT DOCUMENTS

2003/0096636 A1* 5/2003 Rudrapatna et al. ......... 455/562
2006/0114813 A1* 6/2006 Seki et al. .................... 370/208
2006/0217093 A1* 9/2006 Wang et al. .................. 455/136
2007/0160014 A1* 7/2007 Larsson ....................... 370/338

FOREIGN PATENT DOCUMENTS

WO    WO 2005004376 A1 *    1/2005

OTHER PUBLICATIONS

Translation of WO 2005/004376, publication date Jan. 13, 2005.*
J. Nicholas Laneman et al., Cooperative Diversity in Wireless Networks: Efficient Protocols and Outage Behavior, IEEE Transactions on Information Theory, vol. 50, No. 12, Dec. 2004, pp. 3062-3080.
Ernesto Zimmermann et al., On the Performance of Cooperative Relaying Protocols in Wireless Networks, European Transactions on Telecommunications, 2005.
Patrick Herhold et al., A Simple Cooperative Extension to Wireless Relaying, Int. Zurich Seminar on Communications, 2004.

* cited by examiner

*Primary Examiner*—Rafael Pérez-Gutiérrez
*Assistant Examiner*—Marcos Batista
(74) *Attorney, Agent, or Firm*—The Farrell Law Firm, LLP

(57) ABSTRACT

Disclosed is a method of providing cooperative diversity in a Multiple Input Multiple-Output (MIMO) wireless network including a source station, a relay station, and a destination station each for transmitting a plurality of streams through multiple antennas, the method including: decoding, by a relay station, a plurality of streams received from the source station, checking for errors in the individual decoded streams, and transmitting error detection information to the source station and thereafter relaying streams having no errors to the destination station and retransmitting, by a source station, streams corresponding to streams which were previously found to include errors to the destination station based on the error detection information.

3 Claims, 3 Drawing Sheets

METHOD OF PROVIDING COOPERATIVE DIVERSITY IN A MIMO WIRELESS NETWORK

PRIORITY

This application claims priority under 35 U.S.C. §119 to an application entitled "Method of Providing Cooperative Diversity in a MIMO Wireless Network" filed in the Korean Intellectual Property Office on Jul. 7, 2005 and assigned Ser. No. 2005-61171, and to an application entitled "Method of Providing Cooperative Diversity in a MIMO Wireless Network" filed in the U.S. Patent and Trademark Office on Apr. 20, 2005 and assigned Provisional Application No. 60/673,133, the contents of both of which are incorporated herein by reference.

BACKGROUND OF THE INVENTION

1. Field of the Invention

The present invention relates generally to transmit diversity in wireless communications, and in particular, to a method of providing cooperative diversity in a Multiple-Input Multiple-Output (MIMO) wireless network with at least one transmit antenna and at least one receive antenna.

2. Description of the Related Art

Typically, diversity gain and multiplexing gain are in a trade-off relationship. As the multiplexing gain of transmission increases, the diversity gain decreases, and vice versa. This problem can be overcome by the use of cooperative diversity.

Cooperative diversity is a technique for achieving diversity through cooperation between networks using a relay station. The relay station operates in either an Amplify-and-Forward (AF) or Decode-and-Forward (DF) mode. While the relay station amplifies a received signal prior to retransmission in the AF mode, it fully decodes the received signal, encodes the decoded signal, and then relays the coded signal in the DF mode. Due to the retransmission without decoding, the AF relay has the shortcoming that noise involved in the received signal is amplified at transmission. Although the DF relay does not suffer from the noise amplification as does the AF relay, the DF relay suffers from decoding errors that can cause errors in the coded signal. Along with a MIMO technique the cooperative diversity technique is an attractive technology for use in various, complex time and space wireless environments with limited frequency spectrum as it can provide a high data rate, an improved service quality, and a high network capacity.

However, most conventional cooperative techniques, such as the aforementioned cooperative diversity technique, were developed for implementation in a Single-Input Single-Output (SISO) network with a 1×1 antenna structure. Little is known about providing cooperative diversity for a MIMO network, and much of what is known about cooperative diversity is a mere expansion of the cooperative diversity for the SISO network. For example, a Selection Decode-and-Forward (SDF) technique was proposed in which a relay station transmits a Negative Acknowledgement (NACK) signal to a source station if a signal received from the source station is found to contain errors during decoding by the relay station.

The source station retransmits the stream to the destination source station, and the relay station relays the retransmitted signal after encoding it to the destination station if no decoding errors have occurred (e.g., see, J. N. Laneman, D. N. C. Tse, and G. W. Wornell, "Cooperative Diversity In Wireless Networks: Efficient Protocols And Outage Behavior," IEEE Trans. Inform. Theory, vol. 50, 2004). In an application of the SDF technique to a MIMO network, if at least one error is detected from a plurality of streams received from the source station during decoding, the relay station transmits a NACK signal to the source station so that the source station retransmits all of the plurality of streams to the destination station, and in the absence of errors, the relay station relays the decoded signal after encoding it to the destination station. However, a plurality of streams characteristic of MIMO have not been individually considered in the simple expansion of the conventional cooperative diversity for MIMO networks.

SUMMARY OF THE INVENTION

An object of the present invention is to substantially solve at least the above problems and/or disadvantages and to provide at least the advantages below. Accordingly, the present invention provides a cooperative diversity method for relaying individual streams independently in an Selection Decode-And-Forward (SDF) mode for multi-stream transmission in a Multiple-Input Multiple-Output (MIMO) wireless network.

It is a further object of the present invention to provide a method of providing cooperative diversity in a MIMO wireless network including a source station, a relay station, and a destination station each for transmitting a plurality of streams through multiple antennas, the method including decoding, by the relay station, a plurality of streams received from the source station, checking for errors in the individual decoded streams, transmitting error detection information to the source station and thereafter relaying streams having no errors to the destination station; and retransmitting, by the source station, streams having which were previously found to contain errors to the destination station based on the error detection information.

Thus, the plurality of streams are transmitted independently of each other.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1A:
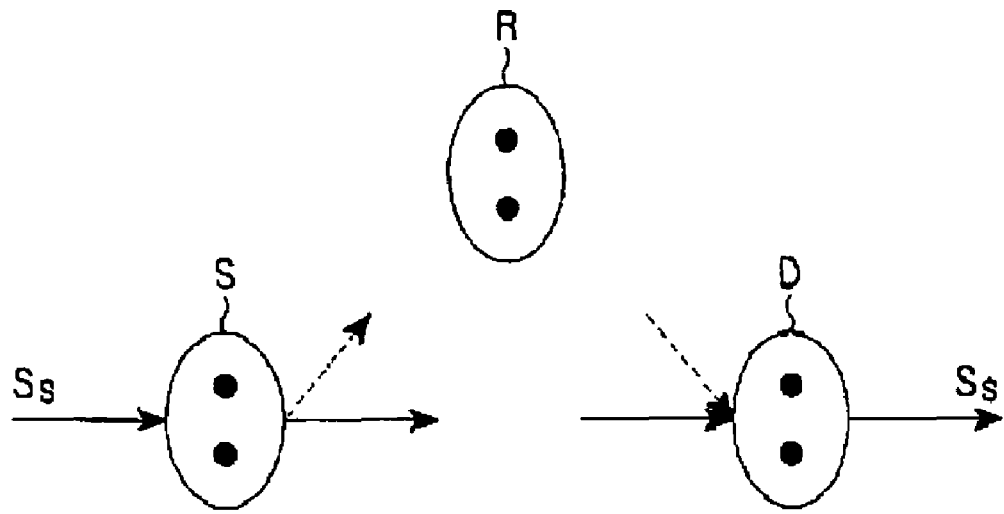
FIG. 1A is a block diagram illustrating the configuration of a MIMO wireless network that provides cooperative diversity according to the present invention.

FIG. 1A is a block diagram illustrating a configuration of a MIMO wireless network that provides cooperative diversity according to the present invention.

As illustrated in FIG. 1A, the present invention is applied to a MIMO wireless network including a source station S, a destination station D for receiving a signal from the source S, and a relay station R for relaying signals between the source station S and the destination station D. Thus, the source station S, the relay station R and the destination station D each have a plurality of antennas and transmit a plurality of streams.

Figure 1B:
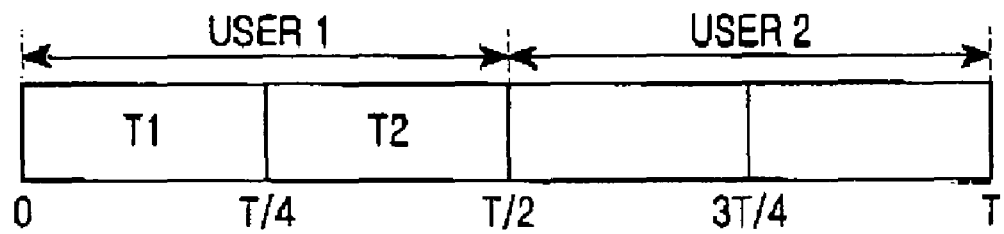
FIG. 1B is a diagram illustrating a plurality of time slots spanning a period T in which stations can transmit or receive signals according to the present invention.

FIG. 1B is a diagram illustrating a plurality of time slots spanning a period T in which stations can transmit or receive signals according to the present invention. The illustrated case of FIG. 1B is based on the assumption that one user uses a T/2 time slot and the source station S and the relay station R use equal halves of the T/2 time slot. The source station S transmits a signal to the relay station R and the destination station D for a transmission interval T1. For a transmission interval T2, the relay station R relays the received signal to the destination station D or the source station S retransmits the signal to the destination station D. This signal transmission will be described below in more detail with reference to FIG. 2.

Figure 2:
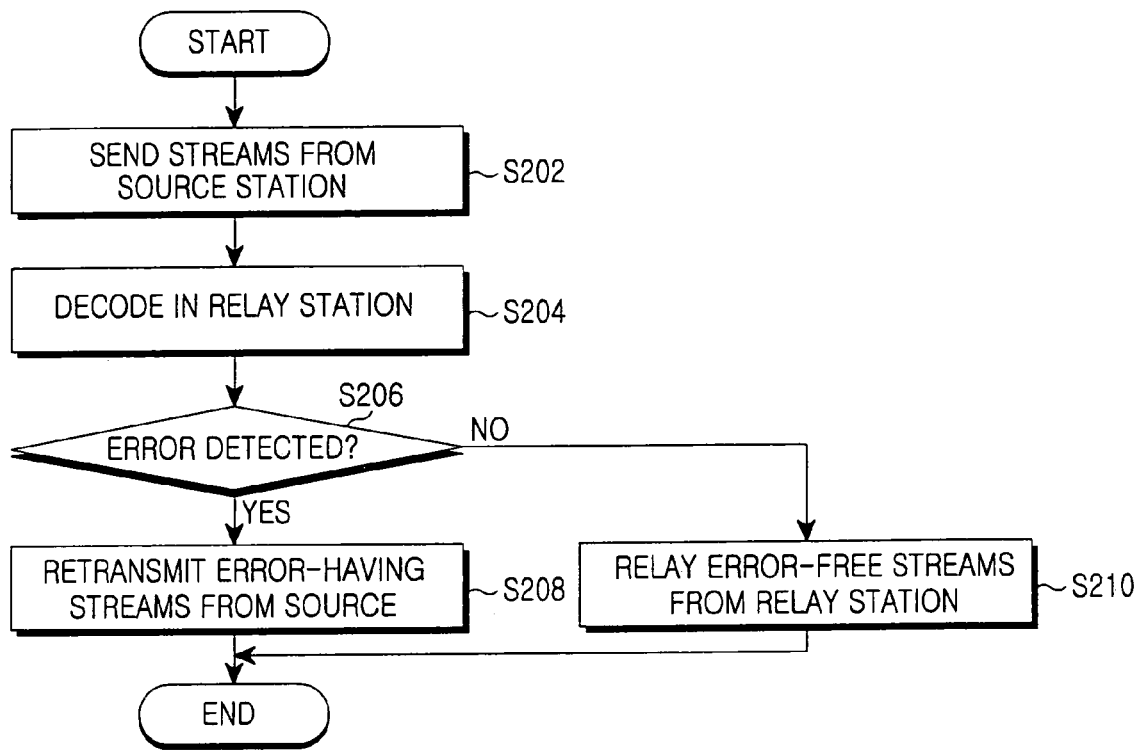
FIG. 2 is a flowchart illustrating a method of providing cooperative diversity according to the present invention.

FIG. 2 is a flowchart illustrating a method of providing cooperative diversity according to the present invention. Referring to FIG. 2, the source station S transmits a plurality of streams to the relay station R and the destination station D, for the transmission interval T1 in step S202. The signals received at the relay station R and the destination station D are expressed as Equation (1):

$$y_r[T1] = H_{s,r} s_s[T1] + z_r[T1]$$
$$y_d[T1] = H_{s,d} s_s[T1] + z_d[T1] \quad (1)$$

where $y_r$ denotes an $M_r \times 1$ signal vector received at the relay station R, $H_{s,r}$ denotes an $M_s \times M_r$ channel matrix between the source station S and the relay station R, $s_s$ denotes an $M_s \times 1$ signal vector transmitted from the source station, $z_r$ denotes an $M_r \times 1$ noise vector, $y_d$ denotes an $M_d \times 1$ signal vector received at the destination station D, $H_{s,d}$ denotes an $M_s \times M_d$ channel matrix between the source station S and the destination station D, and $z_d$ denotes a $M_d \times 1$ noise vector.

Additionally, $M_s$, $M_r$, and $M_d$ represent the numbers of antennas in the source station S, the relay station R and the destination station D, respectively.

Upon receipt of $y_r[T1]$, in step S204 the relay station R decodes an $1^{th}$ stream (where $1=1, 2, \ldots, M_s$) by Equation (2):

$$DEC_1(y_r[T1]), \text{ for } l=1, 2, \ldots, M_s \quad (2)$$

The relay station R decodes the received streams individually in the above manner.

In step S206, the relay station R checks errors in the decoded streams. The relay station R relays error-free streams to the destination station D in step S210. These relayed streams are given as Equation (3):

$$DEC_1(y_r[T1]) = s_s[T1,l] = s_r[T2,l] \quad (3)$$

Decoding of the $1^{th}$ stream of the signal $y_r[T1]$ received at the relay station R during the transmission interval t1 results in the $1^{th}$ stream $s_s[T1,1]$ transmitted from the source station S for the transmission interval T1. The relay station R transmits $s_s[T1,1]$ as a relayed $1^{th}$ stream $s_r[T2,1]$ to the destination station D during transmission interval T2.

Meanwhile, if a result of the error detection step S206 it is determined that the streams contain errors, the source station S retransmits streams which found to contain errors in the previous transmission to the destination station D in step S208. As the relay station R notifies the source station S of the streams which were found to contain errors, the source station S can retransmit the transmitted streams, which are expressed as Equation (4):

$$s_s[T2,l] = s_s[T1,l] \quad (4)$$

That is, the source station S retransmits $s_s[T1, 1]$ as $s_s[T2, 1]$ during the transmission interval T2.

As described above, the present invention is characterized in that a plurality of individual streams are relayed independently in the MIMO wireless network.

In the case where the source station S retransmits streams or the relay station R relays streams, an Opportunistic Transmit Diversity (OTD) technique is applicable according to the number of the transmitted streams and the number of antennas in the source station S or the relay station R. The OTD technique is a type of an antenna transmit diversity technique, in which an application of transmit diversity is determined according to the number of antennas and the number of transmission streams.

To be more specific, the relay station R relays streams having no decoding errors to the destination station D. If the number of transmit antennas, $N_r$ is greater than the number of transmission streams, $L_r$ in the relay station R (where, $N_r > L_r$), the relay station R selectively uses $L_r$ antennas or the whole $N_r$ antennas for transmit diversity. In the latter case, better performance is achieved.

The source S retransmits the streams which were found to contain errors during decoding by the relay station R to the destination station D.

Since the previously transmitted streams are retransmitted (if they were found to contain errors), the source station S uses a MIMO Hybrid Automatic Repeat Request (HARQ) technique. This means that the retransmitted streams are not transmitted through the same antennas as were previously used to transmit the original streams. But, rather, the retransmitted streams are transmitted using different antennas. For example, if streams S1 and S2 are transmitted initially through antenna 1 and antenna 2, respectively, S2 would be retransmitted through antenna 1 and S1 would be retransmitted through antenna 2. Space-time coding can also be used. Thus, the conjugate of S2, S2* is retransmitted through antenna 1 and –S1* is retransmitted through antenna 2. In this way, the reception performance of the destination station D is enhanced.

Figure 3:
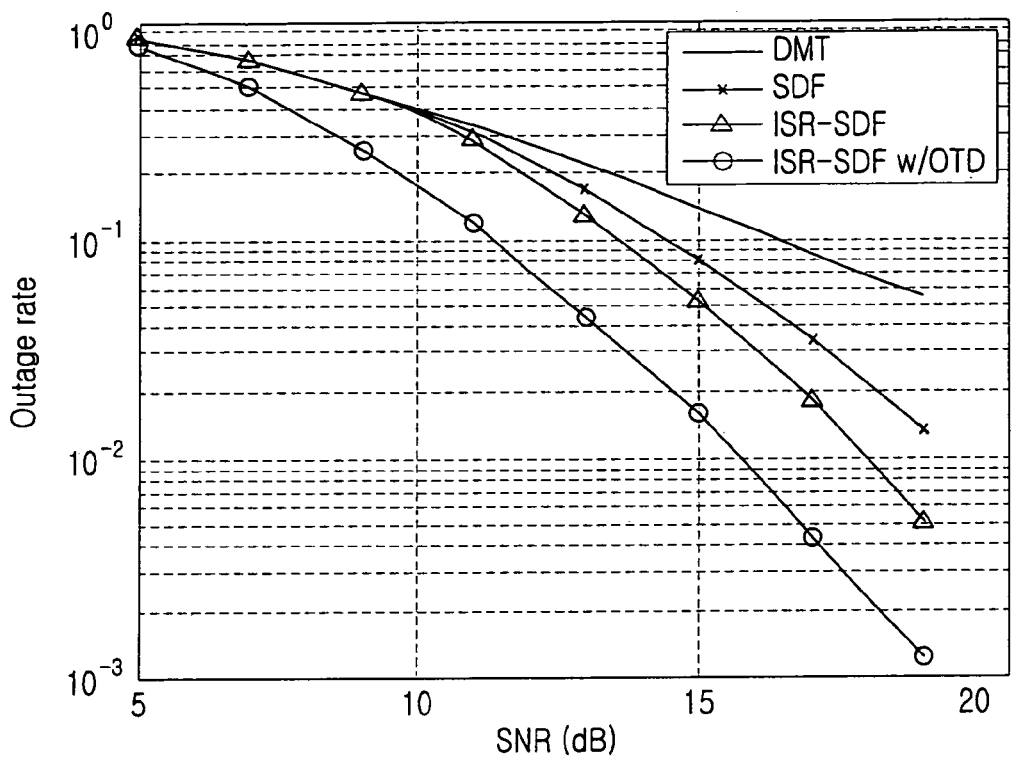
FIGS. 3 and 4 are graphs illustrating the performance of the present invention.
Figure 4:
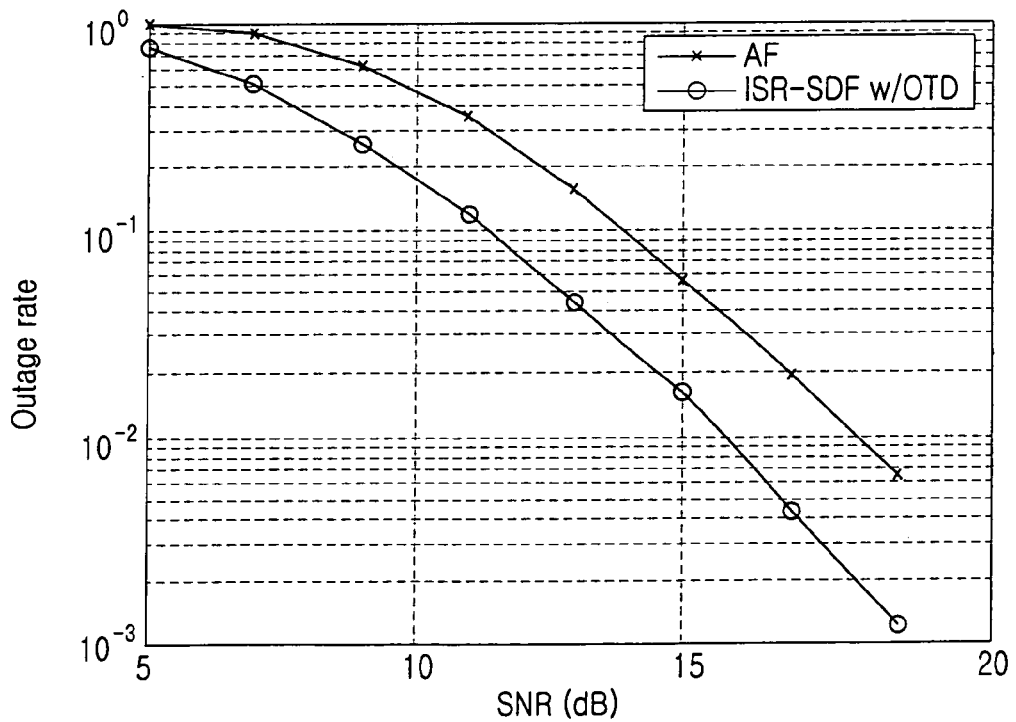

FIGS. 3 and 4 are graphs comparing the performance characteristics of a communication system according to the present invention with performance characteristics of communication systems incorporating conventional technologies. Referring to FIG. 3, the SDF mode outperforms a basic MIMO scheme, Direct MIMO Transmission (DMT) and an Independent Stream Relaying (ISR)-SDF mode in which streams are transmitted independently according to the present invention outperforms SDF. Particularly, ISR-SDF with OTD further improves performance. Referring to FIG. 4, the present invention outperforms AF relay.

In accordance with the present invention as described above, a cooperative diversity method for relaying a plurality of streams independently is provided for a MIMO wireless network. Therefore, diversity gain is increased in the MIMO wireless network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of providing cooperative diversity in a multiple-input multiple-output (MIMO) wireless network including a source station, a relay station, and a destination station each for transmitting a plurality of streams through a plurality of antennas, comprising the steps of:

decoding a plurality of streams received from a plurality of transmit antennas of the source station during a first time duration, checking errors in each of the plurality of decoded streams, and transmitting information of streams having errors to the source station by the relay station;

relaying streams having no errors to the destination station by the relay station using all transmit antennas of the relay station during a second time duration, if a number of the transmit antennas of the relay station is greater than a number of the streams having no errors; and receiving, by the source station, the information of the streams having errors and retransmitting the streams having errors to the destination station by the source station during the second time duration, whereby the plurality of streams are transmitted independently using different transmit antennas of the source station.

2. The method of claim 1, wherein the streams having errors are retransmitted using different transmit antennas from transmit antennas used at a previous transmission.

3. The method of claim 2, wherein the streams having errors are retransmitted using a space-time coding scheme.

* * * * *